M. HANAUER.
MACHINE FOR STIRRING MAPLE SUGAR.
APPLICATION FILED JAN. 29, 1920.
1,341,743.
Patented June 1, 1920.
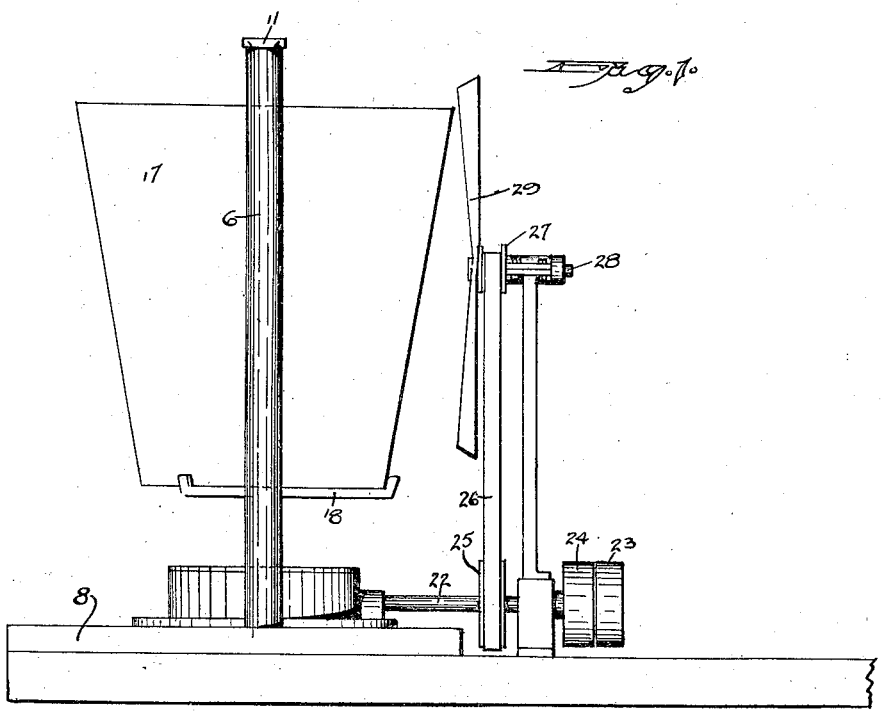

M. HANAUER.
MACHINE FOR STIRRING MAPLE SUGAR.
APPLICATION FILED JAN. 29, 1920.
1,341,743.
Patented June 1, 1920.
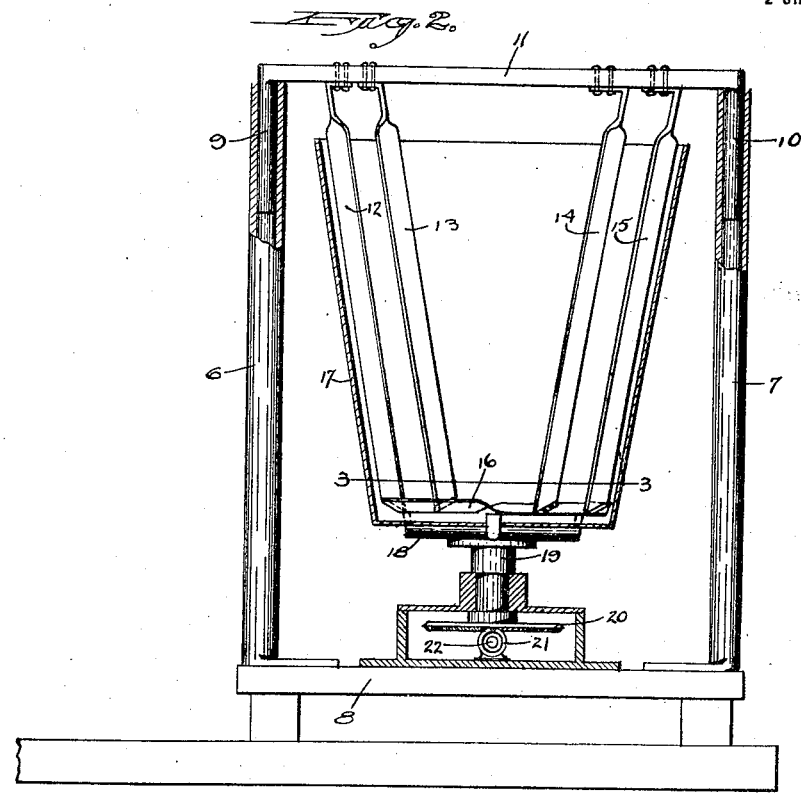
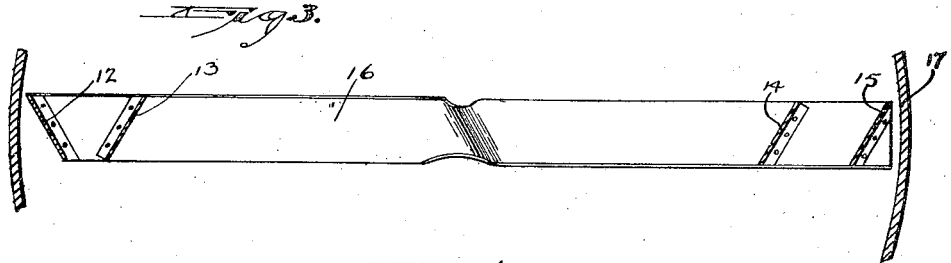
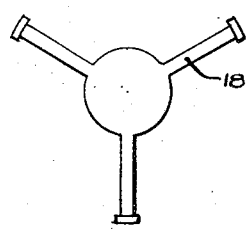

UNITED STATES PATENT OFFICE.

MICHAEL HANAUER, OF TOLLAND, MASSACHUSETTS.

MACHINE FOR STIRRING MAPLE-SUGAR.

1,341,743. Specification of Letters Patent. Patented June 1, 1920.

Application filed January 29, 1920. Serial No. 354,802.

*To all whom it may concern:*

Be it known that I, MICHAEL HANAUER, a citizen of the United States, residing at Tolland, in the county of Hampden and State of Massachusetts, have invented a new and useful Improvement in Machines for Stirring Maple-Sugar; and I do hereby declare the following, when taken in connection with the accompanying drawings and the characters of reference marked thereon, to be a full, clear, and exact description of the same, and which said drawings constitute part of this application, and represent, in—

Figure 1, a side view of a machine for stirring maple sugar constructed in accordance with my invention.

Fig. 2, a front view partly in section of the same.

Fig. 3, a sectional view on the line 3—3 of Fig. 2 enlarged.

Fig. 4, a top or plan view of the support for a receptacle.

In the manufacture of maple sugar after the sap has been sufficiently boiled it is stirred as it cools and the quality of the sugar depends upon the amount of stirring. This stirring has usually been done by hand and consequently different lots differ in color and quality. The object of this invention is to provide a device by which the boiled sap may be stirred and at the same time cooled and the invention consists in the construction as hereinafter described and particularly recited in the claims.

In carrying out my invention I employ two tubular uprights 6 and 7 suitably mounted upon a base 8 and into the upper ends of the uprights I insert the downwardly extending fingers 9 and 10 of a yoke 11 to the under side of which I attach blades 12, 13, 14 and 15, the lower ends of which are connected to a bottom blade 16 which is twisted at its center, the blades 14 and 15 being parallel with each other while the blades 12 and 13 stand at an angle to each other as clearly shown in Fig. 3 of the drawings. These blades extend into a cooking receptacle 17, to the sides of which the blades stand parallel. This cooking receptacle is held at the bottom by a crow's-foot 18 which is fixed to the upper end of a post 19, the lower end of which is provided with a beveled gear 20 meshing with a beveled gear 21 on a shaft 22 which may be driven by any suitable power, as herein shown it is provided with a fixed pulley 23 and a loose pulley 24 over which a belt may pass to any suitable motor. Also fixed to the shaft 22 is a pulley 25 over which a belt 26 may run to a pulley 27 on a shaft 28 suitably supported and carrying fan blades 29. The parts being assembled as shown, the boiled sap is placed in the receptacle 17 and power applied to the shaft 22 so as to turn that receptacle and as it turns the edge of the blade 12 attends to force the material inward away from the sides of the receptacle while the blades 13, 14 and 15 tend to force the material toward the center of the receptacle and the bottom blade 16 also tends to stir the sap; at the same time the receptacle is cooled by the movement of the fan blades 29. With a machine thus described, a larger quantity of boiled sap may be stirred than it is possible to do by hand; the sap is stirred evenly and so that the quality of the sugar is greatly improved and the operation is performed more rapidly and without the expenditure of a great deal of energy.

I claim:

1. A machine for stirring maple sugar comprising a base two vertical tubular posts mounted thereon, a yoke having downwardly extending ends entering the said tubular posts, blades secured to the underside of said yoke, a receptacle into which the blades extend and means mounted on said base for supporting and rotating said receptacle.

2. A machine for stirring maple sugar comprising two vertical posts, a yoke connected with the upper ends thereof, a plurality of blades secured to the underside of said yoke and extending downward therefrom, said blades connected at their lower ends by a blade, a receptacle into which the said blades extend, a support for said receptacle, means for rotating said support including a driving shaft and a fan mounted at one side of the receptacle and adapted to be driven by the said driving shaft.

In testimony whereof, I have signed this specification in the presence of two subscribing witnesses.

MICHAEL HANAUER.

Witnesses:
JAMES E. DEAN,
HENRY HANAUER.